Aug. 8, 1950 — K. WILLIAMS — 2,517,749
FRICTION SHOCK ABSORBING MECHANISM
Filed Aug. 7, 1946 — 2 Sheets-Sheet 1
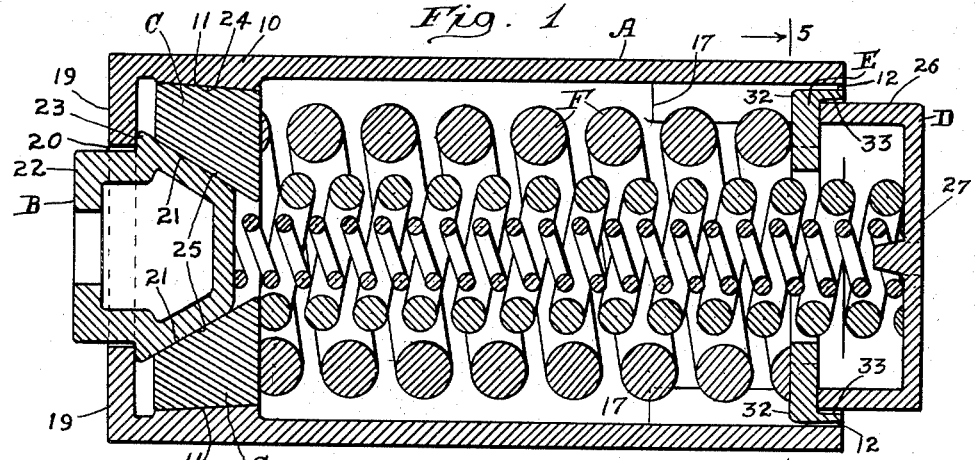
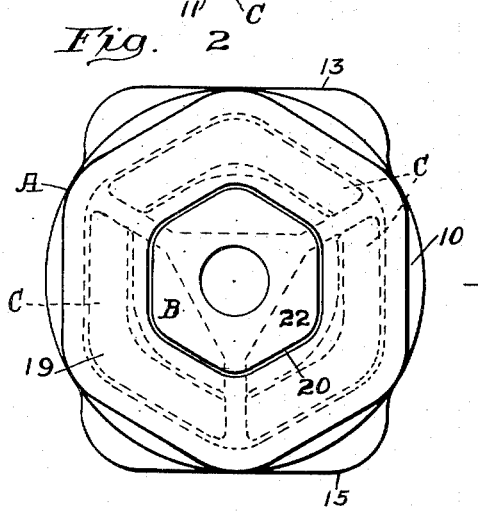
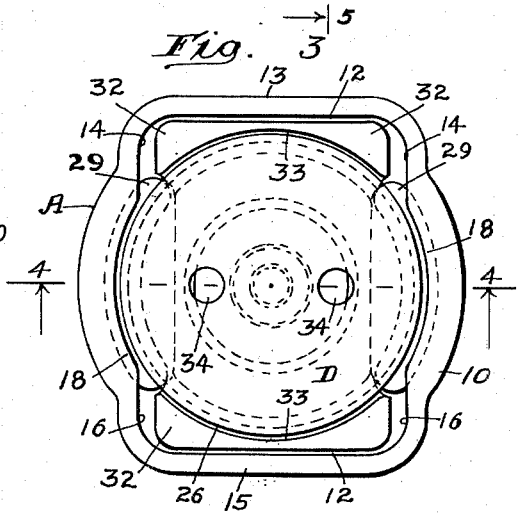
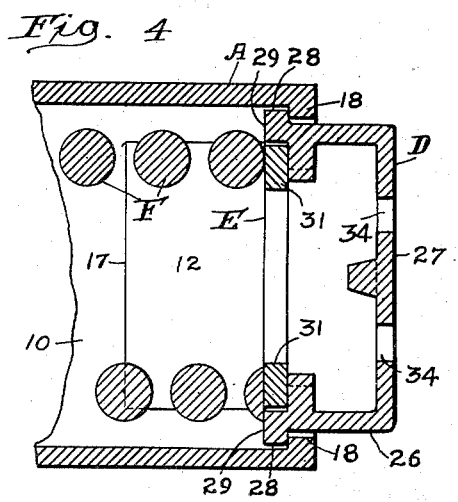
Inventor:
Keith Williams.
By George I. Haight
Atty.

Aug. 8, 1950  K. WILLIAMS  2,517,749
FRICTION SHOCK ABSORBING MECHANISM
Filed Aug. 7, 1946  2 Sheets-Sheet 2

Inventor:
Keith Williams.
By George I. Haight
Atty

Patented Aug. 8, 1950

2,517,749

UNITED STATES PATENT OFFICE 2,517,749

FRICTION SHOCK ABSORBING MECHANISM

Keith Williams, Buffalo, N. Y.

Application August 7, 1946, Serial No. 688,859

5 Claims. (Cl. 213—34)

This invention relates to improvements in friction shock absorbing mechanisms for railway draft riggings, and more particularly to mechanisms of this character having preliminary spring action, wherein the frictional resistance is provided by cooperating friction members comprising a friction casing and a spring-resisted friction clutch slidingly telescoped within one end of the casing, and wherein the preliminary spring action is provided by a movable spring cap telescoped within the other end of the casing and resisted by the same spring means which opposes movement of the friction clutch.

One object of the invention is to provide in a mechanism of the character indicated a spring cap which may be readily applied and easily detached, wherein the cap and casing have interengaging registering stops thereon for restricting outward movement of the cap and hold the same assembled with the casing, the cap being locked against rotation with respect to the casing to maintain the interengaging lugs of the same and the casing in alignment by a locking element movable with the cap and held against rotation with respect to the casing by cooperating guide means on the casing and locking element.

A more specific object of the invention is to provide a friction shock absorbing mechanism having preliminary spring action, including a friction casing, a spring resistance within the casing, and a preliminary spring cap telscoped within the casing, wherein the casing is equipped with inturned stop flanges at diametrically oppositely sides thereof engageable by registering stop flanges at diametrically opposite sides of the cap to limit outward movement of the latter, and the cap is locked against rotation with respect to the casing by a locking element having diametrically opposite locking projections engageable between the stop flanges of the cap and slidingly guided in lengthwise extending channels in the casing, the channels being of a length to permit displacement of the locking element inwardly of the casing away from the cap and entirely clear of the same and unlocked therefrom, thereby freeing the cap so that the same may be rotated or turned to either apply it to or remove it from the casing.

Other objects of the invention will more clearly appear from the description and claims hereinafter following.

Figure 6:
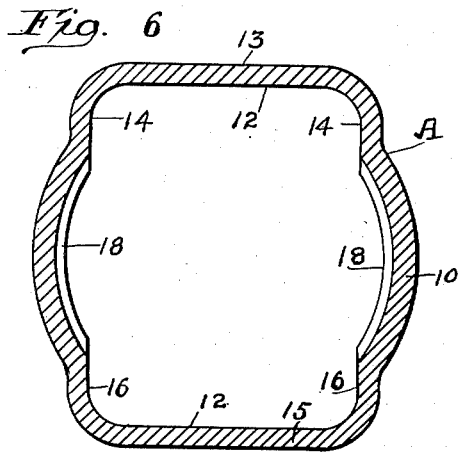
Figure 7:
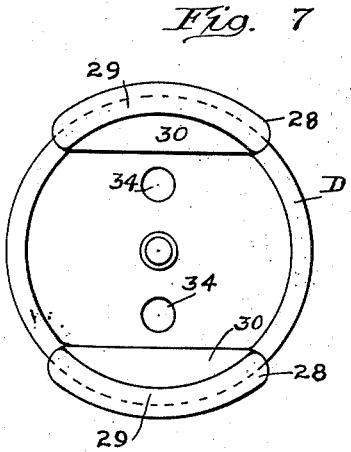
Figure 10:
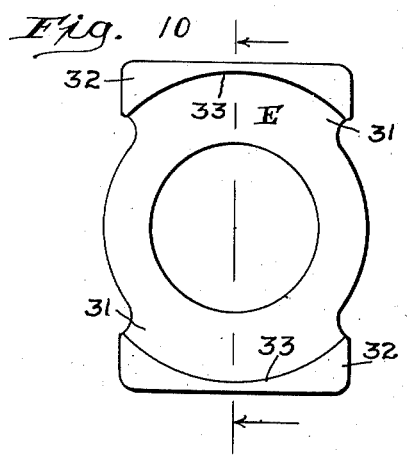
Figure 11:
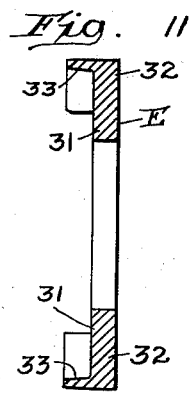
Figure 8:
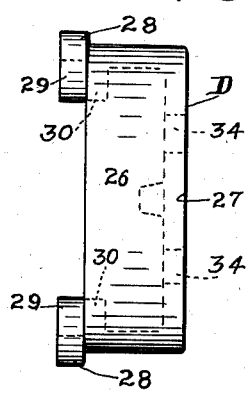
Figure 5:
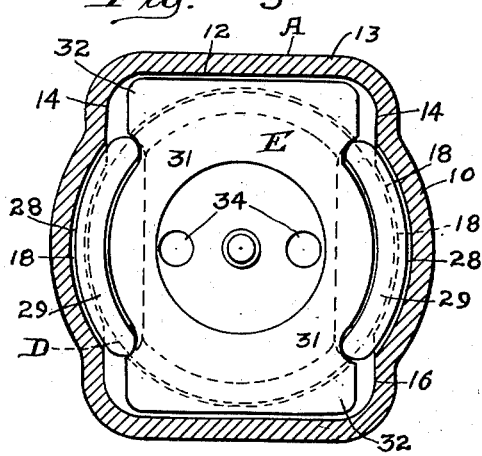
Figure 9:
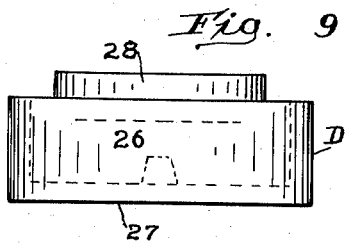

In the accompanying drawings, forming a part of this specification, Figure 1 is a longitudinal, vertical sectional view of a friction shock absorbing mechanism, illustrating my improvements in connection therewith. Figure 2 is a front end elevational view of Figure 1, looking toward the right in said figure. Figure 3 is a rear elevational view of Figure 1, looking toward the left in said figure. Figure 4 is a horizontal sectional view, partly broken away, corresponding substantially to the line 4—4 of Figure 3. Figure 5 is a transverse, vertical sectional view, corresponding substantially to the line 5—5 of Figure 1, with the springs omitted. Figure 6 is a view similar to Figure 5, with the spring cap and locking element omitted. Figure 7 is a plan view of the spring cap of my improved mechanism. Figure 8 is a side elevational view of Figure 7, looking toward the left in said figure. Figure 9 is a side elevational view of Figure 7, looking upwardly. Figure 10 is a plan view of the locking element for the spring cap, looking toward the left in Figure 1. Figure 11 is a vertical sectional view, corresponding substantially to the line 11—11 of Figure 10.

My improved friction shock absorbing mechanism, as shown in the drawings, comprises broadly a friction casing A; a wedge block B; three friction shoes C—C—C; a preliminary spring cap D; a locking element E; and a spring resistance F.

The friction casing A is in the form of a tubular casting open at its front and rear ends and having the friction shell section proper thereof formed at its forward end. The friction shell section, which is indicated by 10, is of substantially hexagonal interior and exterior, transverse cross section and presents three rearwardly converging, interior friction surfaces 11—11—11 of V-shaped transverse cross section, each surface 11 being formed by two adjacent walls of the hexagonal shell section of the casing. Rearwardly of the friction shell section 10, the casing A is of cylindrical shape, except at the extreme rear end thereof where it is expanded at the top and bottom sides to provide channel-shaped top and bottom interior guideways 12—12. As clearly shown in Figure 6, the top guideway 12 is formed by a horizontal top wall 13 and short vertical side walls 14—14 merging with the curved walls of the cylindrical portion of the casing, and the bottom guideway 12 is formed by a horizontal bottom wall 15 and vertical side walls 16—16 merging with the curved walls of the casing. These channel-shaped guideways are closed at their forward ends by transverse walls 17—17 connecting the cylindrical wall of the casing with the walls of the guideways 12—12, thereby presenting front limiting shoulders. At the rear extremities thereof, the curved side walls of the casing, which lie between the top and bottom guideways 12—12, are provided with arc-shaped, inturned stop flanges 18—18, which cooperate with the cap D to anchor the same to the casing and limit outward movement thereof.

At the open forward friction shell end of the casing, there is provided a relatively wide, inturned stop flange 19, which extends entirely therearound and defines a hexagonal central opening 20.

The wedge block B, which is preferably hollow, has three inwardly converging wedge faces 21—21—21 at its inner end of V-shaped transverse cross section, arranged symmetrically about the longitudinal central axis of the mechanism. At the forward end, the wedge block B is reduced in size, providing a projection 22 which is of hexagonal transverse cross section and extends freely through the opening 20 of the casing. A transverse shoulder 23 is thus provided on the wedge block at the inner end of the reduce projection 22, which is continuous around the wedge block and is adapted to engage the inner side of the stop flange 19 to limit outward movement of the wedge block.

The three friction shoes C—C—C surround the inner end of the wedge block and are interposed between the same and the friction surfaces 11—11—11 of the friction shell section of the casing. Each shoe has a friction surface 24 on the outer side thereof of V-shaped transverse cross section engaging the corresponding V-shaped friction surface 11 of the casing. On the inner side, each shoe has a wedge face 25 of V-shaped cross section engaging the corresponding V-shaped wedge face 21 of the block B.

The preliminary spring cap D is telescoped within the rear end of the casing A. This cap is of cup-shaped form having a cylindrical side wall 26 and a transverse vertical rear end wall 27. At the inner end, the cap D has a pair of laterally outwardly extending retaining flanges 28—28 at diametrically opposite sides thereof, which are of arc shape and are formed on extensions 29—29 of the side wall of the cap. The end edges of the wall extensions 29—29 and the flanges 28—28 thereon are preferably rounded off, as shown. At the sides thereof, which carry the flanges 28—28, the cap D is provided with interior, laterally inwardly projecting webs 30—30, each web 30 forming a wall section projecting from the side wall of the cap and extending from one end edge to the other of the corresponding extension 29 of said side wall. The webs 30—30 are inset with respect to the flanges 28—28 of the cap, having their outer surfaces flush with the inner edge of the unextended portions of the side wall of said cap. The spring cap D extends through the space between the flanges 18—18 of the casing and has the diametrical flanges 28—28 thereof aligned with and overlapping the flanges 18—18 of the casing. In the normal position of the parts, the flanges 28—28 engage the flanges 18—18, thereby limiting outward movement of the cap.

The locking element E, which is in the form of a heavy, washerlike ring, has diametrically opposite extensions or wings 31—31 which fit within the channel-shaped guideways 12—12 of the casing. The wings 31—31 are provided with laterally outstanding or rearwardly projecting, relatively heavy tongues or flanges 32—32 having curved inner edge faces 33—33 adapted to fit the cylindrical side wall of the cap D. The element E is arranged to be engaged over the open inner end of the cap D with the flanged side thereof facing the cap and seated on the webs 30—30 and the inner end edge of the side wall thereof between the extensions 29—29, with the wings 31—31 seated between said side wall extensions. When thus positioned, the flanges 32—32 of the locking element E embrace the cap at opposite sides. The locking element E and the cap D are thus locked to each other against relative rotation.

In the assembled condition of the mechanism, the locking element E travels inwardly and outwardly with the cap D, thus forming in effect a part of the cap. The tongues or flanges 32—32 of the locking element are preferably of such a length that they project between the flanges 18—18 of the casing and have their outer ends flush with the rear end of the casing when the cap is in its outermost position with the flanges 28—28 thereof engaged with the flanges 18—18. As will be evident, the cap is locked against rotation with respect to the casing at all times during its in-and-out movement by the locking element E with which it is interlocked against rotation by the flanges 28—28 and 32—32, the locking element being held against rotation by the wings 31—31 being slidingly engaged in the channel-shaped guideways 12—12 of the casing.

The spring resistance F, which is disposed within the casing A, preferably comprises three coils—a relatively heavy outer coil, a central coil, and an intermediate coil within the outer coil surrounding the central coil. The central and intermediate coils project through the opening of the ringlike locking element E and into the cap D. The outer coil has its front and rear ends bearing respectively on the inner ends of the shoes C—C—C and the locking element E. The central coil has its front and rear ends bearing respectively on the inner end of the wedge block B and the end wall 27 of the cap D, and the intermediate coil has its front and rear ends bearing respectively on the shoes C—C—C and the end wall 27 of the cap. The three coils of the spring resistance F are preferably under initial compression in the assembled condition of the mechanism.

In assembling the mechanism, the wedge B, the three shoes C—C—C, and the spring resistance F, are inserted within the casing A through the open rear end thereof, the casing being stood on end on a suitable support with the wedge free so that it remains in the projected position shown in Figure 1. The locking element E is then pushed into the rear end of the casing with the wings 31—31 thereof aligned with the guideways 12—12 of the casing and forced inwardly against the resistance of the outer coil spring to a point where the outer ends of the flanges 32—32 clear the inner sides of the flanges 18—18 of the casing to a sufficient extent to permit the flanges 28—28 of the cap to pass edgewise therebetween. While the element E is held in this position, the cap D is placed over the outer ends of the inner and intermediate springs with the cap turned to such a position that the flanges 28—28 thereof register with the guide channels 12—12, thus clearing the flanges 18—18 of the casing to permit pushing of the cap into the casing. The cap is then forced inwardly against the resistance of the inner and intermediate springs until the flanges 28—28 of the cap reach a position inwardly or in back of the flanges 18—18. The cap is then given a 90-degree turn by any suitable tool to register the flanges 28—28 with the flanges 18—18 of the casing. To facilitate turning thereof, the cap is preferably provided with spanner wrench-receiving perforations 34—34. After the cap has been thus placed, the pressure is removed from the locking element E, permitting the outer spring to project said element and engage the flanges 32—32 thereof between the flanges 28—28 of the cap, thereby locking the cap against rotation.

As will be understood by those skilled in this art, my improved shock absorbing mechanism is mounted on the railway car between the usual front and rear followers of the draft rigging and is compressed therebetween during both draft and buffing actions. In the operation of my improved shock absorbing mechanism, as the same is being compressed, the preliminary spring cap D is forced inwardly of the casing, carrying the locking element E therewith and compressing the spring resistance F, the static friction existing between the shoes and the casing being too great to permit inward movement of the friction clutch until the spring cap D has been forced inwardly to the full extent of its movement and the cooperating follower of the draft rigging engages with the rear end of the casing A. This compression of the spring F takes care of the lighter shocks encountered in service. After the casing has been engaged by the rear follower of the draft rigging, the wedge B is compelled to move inwardly with respect to the casing, spreading the shoes apart and forcing the same inwardly along the friction surfaces of the casing, with resultant high frictional resistance being produced.

When the actuating force is reduced, the parts of the mechanism are all restored to the normal full release position shown in Figure 1 by the expansive action of the spring resistance F, outward movement of the wedge B being limited by the stop flange 19 of the casing being engaged by the shoulder 23 of the wedge, and outward movement of the spring cap D being limited by engagement of the flanges 28—28 thereof with the flanges 18—18 of the casing.

I claim:

1. In a shock absorbing mechanism, the combination with a tubular cylindrical casing open at its rear end, said rear end of the casing having diametrically opposite wall portions bulged outwardly to provide lengthwise extending guide channels, said channels being open at their rear ends, the connecting wall portions of said casing between said bulged portions having inturned transverse stop flanges at said open rear end; of a spring cap slidingly telescoped within the rear end of the casing and having laterally projecting diametrically opposite flanges engaging said stop flanges to limit outward movement of the cap; a locking element slidable lengthwise in said casing and having guide wings slidingly engaged in said guide channels to hold said element against rotation with respect to the casing; locking projections on said element engaged in interfitting relation between the flanges of the cap to hold the latter against rotation with respect to the locking element and casing; and spring means yieldingly opposing inward movement of the cap and locking element.

2. In a shock absorbing mechanism, the combination with a casing having diametrically opposed, interior stop flanges at opposite sides at one end thereof, and interior top and bottom diametrically opposed guide channels at said end and extending lengthwise of the casing, said channels being circumferentially alternated with said stop flanges; of a spring cap slidingly telescoped within said end of the casing and normally projecting therefrom, said cap having diametrically opposed, outwardly projecting stop flanges thereon engageable with the stop flanges of the casing; a locking element abutting the inner end of said cap and having laterally outwardly projecting wings slideably engaged in said guide channels; rearwardly projecting locking flanges on said wings embracing said cap at opposite sides and engaged between the flanges of the latter in interfitting relation with said flanges; and spring means within the casing yieldingly opposing inward movement of the cap and locking element.

3. In a shock absorbing mechanism, the combination with a casing; of a spring cap slidingly telescoped within one end of the casing and normally projecting rearwardly therefrom, said casing and cap having interengaging stop flanges at diametrically opposite sides thereof restricting outward movement of the cap, said cap being insertable within the casing through said end thereof while in position with the flanges of the cap disposed circumferentially to one side of the flanges of the casing to clear said last named flanges, and being turnable to bring said flanges in lengthwise alignment with the flanges of the casing; interior, lengthwise extending guideways in said casing at diametrically opposite sides thereof, said guideways being circumferentially alternated with said flanges of the casing; a locking ring having laterally projecting wings extending in opposite directions transversely of the cap and having their opposite ends guided in said guideways, said element having rearwardly extending projections on said wings respectively engaging the cap between the flanges thereof in interfitting relation thereto to hold said cap against rotation with respect to the locking element; and spring means within the casing yieldingly opposing inward movement of the cap and element, said spring means including a spring element extending through said ring and bearing on said cap.

4. In a shock absorbing mechanism, the combination with a tubular casing; of a friction clutch slidingly telescoped within one end of the casing; a spring cap slidingly telescoped within the other end of the casing; inturned, circumferentially spaced, diametrically opposed, stop flanges at said second named end of the casing; circumferentially spaced, diametrically opposed inwardly offset flanges on said cap provided with laterally outwardly projecting portions engageable with said stop flanges to limit outward movement of the cap; a locking element bearing on the inner end of said cap, said element having diametrically opposite, laterally outwardly projecting wings provided with rearwardly extending flanges at their outer ends, said wings being engaged between said inwardly offset flanges of the cap with the flanges of said wings engaged between the laterally outwardly projecting portions of the flanges of the cap to lock the cap against rotation with respect to said element; lengthwise extending, interior guideways in the casing with which said projecting wings of the locking element are slidingly engaged to restrict said element to movement lengthwise of the mechanism, said cap being rotatable to dispose the flanges thereof circumferentially to one side of the flanges of the casing to clear the latter flanges when said element is displaced inwardly of the casing with respect to the cap to unlock the same from the cap; and spring means within the casing bearing at one end on the clutch and at the other end on said cap and yieldingly opposing inward movement of the clutch, cap, and locking element.

5. In a friction shock absorbing mechanism, the combination with a friction casing open at its front and rear ends; of a friction clutch slidingly telescoped within the front end of the casing and having sliding frictional engagement therewith; of a spring cap slidingly telescoped within the rear end of the casing, said cap having a diametrically extending seat therein; a transversely extending locking element engaged in said seat; diametrically opposed stop flanges on said cap, said locking element having extensions at opposite ends, arranged side by side with respect to said flanges, in edge to edge engagement therewith, and forming continuations of the diametrically opposed flanges of said cap, said flanges and the continuations thereof providing two piece guide wings at opposite sides of said cap; diametrically opposed, lengthwise extending guideways at the rear end of the casing within which said wings are slidingly engaged, said guideways restricting said wings to movement lengthwise of the mechanism; diametrically opposed, inturned flanges at the rear end of the casing partly closing said guideways, said inturned flanges being in alignment with the flanges of the cap and engageable thereby to limit outward movement of the cap; and means within the casing yieldingly opposing inward movement of the clutch, cap, and locking element.

KEITH WILLIAMS.

REFERENCES CITED

The following references are of record in the file of this patent:

UNITED STATES PATENTS

| Number | Name | Date |
|---|---|---|
| 2,426,262 | Dath | Aug. 25, 1944 |